United States Patent
Thurber et al.

[11] Patent Number: 6,003,263
[45] Date of Patent: *Dec. 21, 1999

[54] FISHING ROD WITH MARKING INDICATIVE OF SPECIES OF FISH FOR WHICH ROD IS DESIGNED

[75] Inventors: John Michael Thurber; Robert David Bagby, both of Tulsa, Okla.

[73] Assignee: Zebco Division of Brunswick Corporation, Tulsa, Okla.

[*] Notice: Under 35 U.S.C. 154(b), the term of this patent shall be extended for 238 days.

[21] Appl. No.: 08/517,183

[22] Filed: Aug. 21, 1995

[51] Int. Cl.⁶ ..................................... A01K 87/00
[52] U.S. Cl. ........................... 43/18.1; D22/142; D22/137
[58] Field of Search ............................. 43/18.1; D22/142, D22/137, 138, 139

[56] References Cited

U.S. PATENT DOCUMENTS

| | | | |
|---|---|---|---|
| D. 179,977 | 4/1957 | Maddox | D22/138 |
| D. 341,870 | 11/1993 | Johnson | D22/139 |
| D. 345,779 | 4/1994 | Baggett et al. | D22/139 |
| D. 346,754 | 5/1994 | Evers | D22/138 |
| D. 354,112 | 1/1995 | Paggi | D22/139 |
| 4,067,133 | 1/1978 | Livingston | 43/18.1 |
| 4,304,620 | 12/1981 | Ashby et al. | D22/142 |
| 5,090,149 | 2/1992 | Kim | 43/18.1 |

FOREIGN PATENT DOCUMENTS

| | | | |
|---|---|---|---|
| 0635582 | 7/1994 | European Pat. Off. . | |
| 0125630 | 8/1982 | Japan | 43/18.1 |
| 3049426 | 3/1988 | Japan | 43/18.1 |

OTHER PUBLICATIONS

WPI Abstract Accession No. 82–10795J/51 and JP57186428 A.
Popular Mechanics, vol. 66, Jul. 1936, p. 120 (43, 18.1) Jr. Ace Complete Fishing Outfits By New York Toy & Game Mfg. Corp., p. 4 (last page), item #58 "Happy Boy" & #59"Teenager" (D22, 142).

Primary Examiner—Michael J. Carone
Assistant Examiner—Darren Ark
Attorney, Agent, or Firm—Wood, Phillips, VanSanten, Clark & Mortimer

[57] ABSTRACT

An improved fishing rod of the type having a substantially cylindrical body with a peripheral surface. The improvement is a mark on the body situated so that the circumference of the fishing rod body with the mark thereon simulates the torso of a selected species of fish, with the mark having markings characteristic of markings on the torso of the selected fish species.

19 Claims, 1 Drawing Sheet

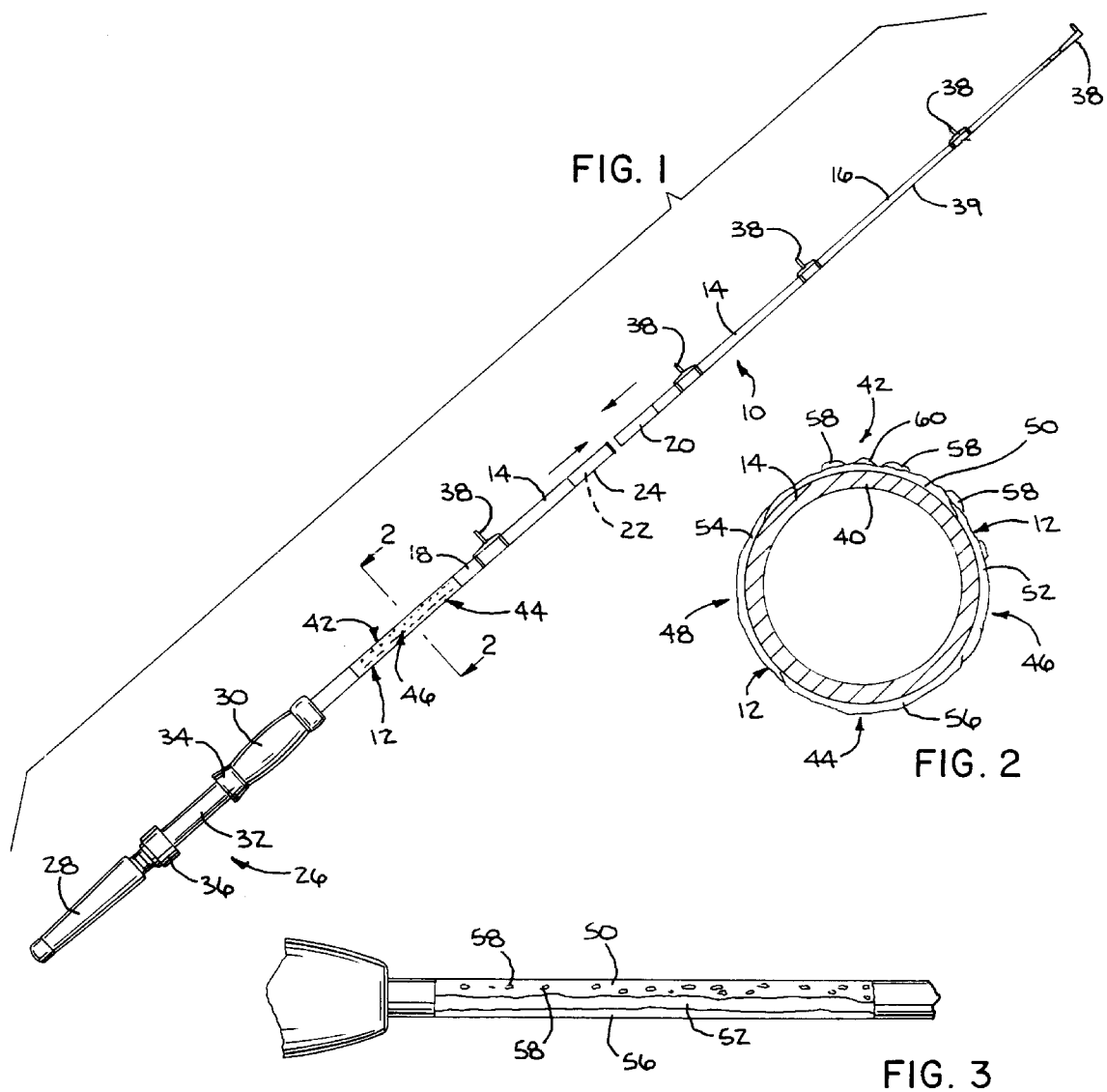
FIG. 1
FIG. 2
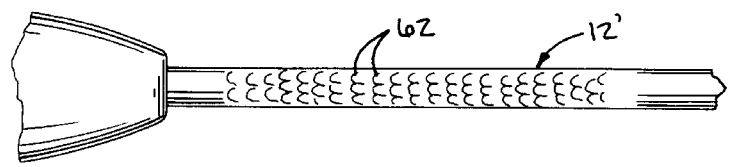
FIG. 3
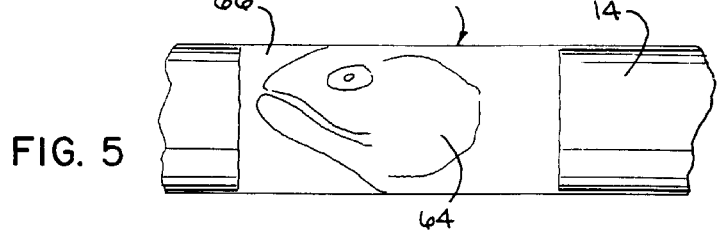
FIG. 4
FIG. 5

FISHING ROD WITH MARKING INDICATIVE OF SPECIES OF FISH FOR WHICH ROD IS DESIGNED

BACKGROUND OF THE INVENTION

1. Field of the Invention

This invention relates to fishing rods and, more particularly, to a mark on a fishing rod that is representative of a visual characteristic of a species of fish, ideally for which species the rod is intended to be used.

2. Background Art

There are a multitude of different types of fishing rods. These rods vary in composition, length, thickness, etc., which give the various fishing rods different durability, flexibility, and feel.

Since different types of fish react differently when taking bait and "fighting", it is desirable to match the fishing rod characteristics to the particular species of fish to maximize feel and enjoyment to the fisherman. For example, when fishing for species that strike a bait in a tentative fashion and are relatively unaggressive when hooked, it is desirable to have a highly sensitive rod. Species that are aggressive fighters permit use of a more rigid rod.

Many manufacturers, including the assignee herein, offer rods with features matched to particular species to maximize enjoyment to the fisherman seeking out that species. If one peruses the displays in sporting goods stores, one will see different rods identified as "bass" rods, "trout" rods, "muskie" rods, etc.

Since there are wide range of materials used in fishing rod construction, it is not always possible to identify the performance characteristics of a fishing rod by its shape. For example, a relatively thin rod may be more rigid than a larger diameter rod by reason of the materials of construction in each.

Thus, the only certain way to determine the species for which a rod is designed is to check the packaging or a tag used by the distributor of the rod. Aside from the fact that reading descriptive materials accompanying fishing rods is often inconvenient, once the rod is in use, the tags and packaging are normally discarded and therefore unavailable. The user may then be forced to guess as to the manufacturer's intended match between rod and species. Even when this information is placed directly on the rod, it is often difficult to see, or may be viewable within a limited angular range. Thus a quick view of an extensive rod display may not be significantly informative.

SUMMARY OF THE INVENTION

In one form of the invention, an improved fishing rod is provided of the type having a substantially cylindrical body with a peripheral surface. The improvement is a mark on the body situated so that the circumference of the fishing rod body with the mark thereon simulates the torso of a selected species of fish, with the mark having markings characteristic of markings on the torso of the selected fish species.

The mark affords a novel device to identify a particular type of fishing rod by a quick glance at the graphics thereon.

The mark has markings that may correspond to the external skin texture, the color, or other feature of the selected species of fish.

The markings preferably extend through 180° and, more preferably, through substantially 360° around the peripheral surface of the fishing rod body.

The rod has a length with spaced butt and tip ends. While the mark could extend fully between the butt and tip ends of the body, in a more preferred form, the mark extends less than the full extent between the ends.

In one form, the fishing rod has a top and bottom and laterally spaced sides and the mark has markings corresponding to at least two of the top, bottom and sides of the torso of the selected fish species.

The mark may have markings corresponding to each of the top, bottom and sides of the torso of the selected fish species at corresponding locations on the circumference of the fishing rod body.

In one form, the cylindrical body of the fishing rod has a base element, with the mark being made up of a material sprayed onto the base element. The mark could be applied to the base element through a silk screen printing process, through airbrushing, or a combination of these processes. The mark could be integrally formed with the base element.

Alternatively, the mark could be applied to the base element as one or more label parts.

The mark may be continuous around the peripheral surface of the rod body, or may be defined by spaced mark portions.

In another form of the invention, an improved fishing rod is provided, with the improvement being a mark extending at least 180° around the circumference of the body and situated so that the circumference of the fishing rod body with the mark thereon simulates the circumference of a part of a selected species of fish with the mark having markings characteristic of markings on the part of the selected fish species.

BRIEF DESCRIPTION OF THE DRAWINGS

FIG. 1 is a side elevation view of a fishing rod having a body with a mark thereon according to the present invention, with markings characteristic of markings on a selected fish species;

FIG. 2 is an enlarged, cross-sectional view of the fishing rod body taken along line 2—2 of FIG. 1;

FIG. 3 is an enlarged, fragmentary, side elevation view of the rod body in FIG. 1;

FIG. 4 is a view as in FIG. 3, with a mark having markings characteristic of markings on a different fish species from that in FIGS. 1–3; and FIG. 5 is a fragmentary, side elevation view of a fishing rod with a mark according to the present invention thereon, with the mark having markings characteristic of markings on the head of a fish species.

DETAILED DESCRIPTION OF THE DRAWINGS

In FIG. 1, a fishing rod is shown at 10 having incorporated therein a mark according to the present invention at 12, which mark 12 has markings characteristic of markings on a selected fish species.

The fishing rod 10 has a conventional construction. The rod 10 is exemplary of but one type of rod into which the present invention can be incorporated. The inventive concept can be practiced with any rod make, type, and style.

The rod 10 shown has a cylindrical body 14 defined by joinable tip and butt sections 16, 18, respectively. The tip section 16 has a male ferrule 20 which is slidable lengthwise into a receptacle 22 defined by a female ferrule 24.

The butt section has a handle 26 with a butt grip 28, a fore grip 30 and a seat 32 for a reel (not shown). A foot (not shown) on a reel can be placed against the reel seat 32 and captively held between a front hood 34 and rear hood 36.

The fishing rod 10 has line guides 38 attached to the peripheral surface 39 of the rod body 14 in conventional fashion.

In a preferred form, it is intended that the mark 12 be applied to the rod body 14, in this case on the butt section 18, in such a fashion that the reel body simulates a torso of a selected species of fish, and as shown in FIGS. 1–3, a trout. The mark 10 gives the appearance that the body 14 is actually a portion of the torso of a fish.

More specifically, the mark 12 is applied to a blank/base element 40 defining the body 14 so that the mark 12 has markings at the top 42 of the rod body 14 corresponding to the markings on the top of the trout, markings at the bottom 44 of the rod body 14 corresponding to the markings on the belly of the trout, and markings on the sides 46,48 of the rod body 14 corresponding to the markings on the sides of the trout.

In this case, the blank/base element 40, has a base color. A layer 50 of green paint is airbrushed onto the blank/base element 40 at the top 42 thereof. Pink layers 52,54 of paint are applied preferably by airbrushing on the sides 46,48 of the blank/base element 40 representing the sides of the trout. The layers 52,54 lap over the layer 50 at the circumferential edges of the layer 50. The silver belly color of the trout is defined by a layer 56 sprayed onto the core/base element 40. The layers 54,52 lap over the layer 56, with the overspray therefrom accounting for a natural transition between the pink sides into the silver belly of the trout.

Raised spots 58 are then applied over the painted layers 50, 52, 54 by a conventional silk screening process. Optionally, a painted area 60 can be used to represent the dorsal fin.

While the unique visual effect from the mark 12 can be realized with the mark 12 extending through at least 180° around the circumference of the rod body 14, in a more preferred form, the mark 12 extends through substantially 360° around the body. Regardless of the viewing angle, the fish species represented by the mark 12 can be readily discerned.

In FIG. 4, a mark 12' is shown having markings corresponding to the external skin texture of the torso of a tarpon. In this case, the scales 62 are shown in a pattern representative of the tarpon species.

The marks 12,12' could be applied in color or shaded black and white. It is desirable that the species of fish depicted by the marks 12,12' be sufficiently distinctive of a particular species to be easily recognizable by the angler.

In FIG. 5, a modified mark 12" is shown in which the head 64 of a species of fish is shown, again exploiting the circumference of the rod body 14 to give a three-dimensional depiction of a part of the fish species, in this case the head. The head features preferably extend through at least 180°, and more preferably 360°, around the rod body 14.

In the case of the mark 12", the mark 12" is in the form of a label with a substrate 66 that can be adhesively bonded to the peripheral surface 39 of the rod body 14.

The foregoing disclosure of specific embodiments is intended to be illustrative of the broad concepts comprehended by the invention.

I claim:

1. A fishing rod comprising:
   a substantially cylindrical body with a circumference and a peripheral surface,
   said cylindrical body having a top and bottom and oppositely facing sides; and
   a mark on the peripheral surface of the fishing rod body to simulate a selected species of fish having a torso with top, bottom and sides with markings on the top, bottom and sides of the fish torso characteristic of the selected species of fish,
   said mark comprising a) markings corresponding to markings on one of the top, bottom and one of the sides of the torso of the selected species of fish on the corresponding top, bottom and one of the sides of the fishing rod body and b) markings corresponding to markings of another of the top, bottom, and the other of the sides of the torso of the selected species of fish on the corresponding top, bottom and the other of the sides of the fishing rod body,
   whereby the full circumference of the fishing rod body with the mark thereon simulates the torso of the selected species of fish,
   the peripheral surface of said fishing rod body having a substantially cylindrical shape over substantially the entire extent of the fishing rod body on which the mark is located.

2. The fishing rod of claim 1 wherein the mark has markings corresponding to the external skin texture of the torso of the selected species of fish and the markings corresponding to the external skin texture extend through at least 180° around the peripheral surface of the fishing rod body.

3. The fishing rod according to claim 1 wherein the mark has markings corresponding to the color of the torso of the selected species of fish extending at least 180° around the peripheral surface of the fishing rod body.

4. The fishing rod according to claim 1 wherein the mark has markings corresponding to the color of the torso of the selected species of fish extending continuously through substantially 360° around the peripheral surface of the fishing rod body.

5. The fishing rod according to claim 1 wherein the fishing rod comprises a base element and the mark comprises a first material sprayed onto the base element and a second material that is applied over a part of the first material using a silk screen printing process.

6. The fishing rod according to claim 1 wherein the mark provides an indication of a species of fish which the fishing rod is intended to be used in catching.

7. A fishing rod comprising:
   a substantially cylindrical body with a circumference and a peripheral surface,
   said cylindrical body having a top and bottom and oppositely facing sides; and
   a mark on the peripheral surface of the fishing rod body to simulate a selected species of fish having a torso with top, bottom and sides with markings on the top, bottom and sides of the fish torso characteristic of the selected species of fish,
   said mark comprising a) markings on the top of the fishing rod body corresponding to the markings on the top of the torso of the selected species of fish, b) markings on the sides of the fishing rod body corresponding to the markings on the sides of the torso of the selected species of fish, and c) markings on the bottom of the fishing rod body corresponding to the markings on the bottom of the torso of the selected species of fish,
   whereby the full circumference of the fishing rod body with the mark thereon simulates the torso of the selected species of fish, the peripheral surface of said fishing rod body having a substantially cylindrical shape over substantially the entire extent of the fishing rod body on which the mark is located.

8. The fishing rod of claim 7 wherein the mark has markings corresponding to the external skin texture of the torso of the selected species of fish.

9. The fishing rod of claim 8 wherein the markings corresponding to the external skin texture extend continuously through substantially 360° around the peripheral surface of the fishing rod body.

10. The fishing rod of claim 7 wherein the mark has markings corresponding to the color of the torso of the selected species of fish.

11. The fishing rod according to claim 7 wherein the fishing rod body has a length with spaced butt and tip ends and the mark extends less than the full extent of the body between the butt and tip ends of the body.

12. The fishing rod according to claim 7 wherein the cylindrical body of the fishing rod comprises a base element and the mark comprises a material sprayed onto the base element.

13. The fishing rod according to claim 7 wherein the cylindrical body of the fishing rod comprises a base element and the mark comprises a material that is applied to the base element using a silk screen printing process.

14. The fishing rod according to claim 7 wherein the cylindrical body of the fishing rod comprises a base element and the mark comprises a material that is airbrushed onto the base element.

15. The fishing rod according to claim 7 wherein the cylindrical body of the fishing rod comprises a base element and the mark comprises at least one label that is bonded to the base element.

16. The fishing rod according to claim 7 wherein the mark extends continuously through approximately 360° around the peripheral surface of the fishing rod body.

17. The fishing rod of claim 7 wherein the fishing rod body has a substantially uniform diameter over substantially the entire extent of the fishing rod body on which the mark is located.

18. The fishing rod of claim 7 wherein the fishing rod body has a length and the peripheral surface of the fishing rod body has a substantially circular shape as viewed in cross section taken transversely to the length of the fishing rod body over substantially the entire extent of the fishing rod body on which the mark is located.

19. The fishing rod according to claim 7 wherein the mark provides an indication of a species of fish which the fishing rod is intended to be used in catching.

\* \* \* \* \*